CYCLOTRON WAVE DOUBLE-STREAM DEVICES

Filed Sept. 8, 1965

7 Sheets-Sheet 1

INVENTOR.
BAYRAM VURAL
BY
Edward J. Norton

INVENTOR.
BAYRAM VURAL
BY
Edward J. Naton

INVENTOR.
BAYRAM VURAL
BY
Edward J. Norton

INVENTOR.
BAYRAM VURAL
BY
Edward J. Norton

Aug. 30, 1966 B. VURAL 3,270,241

CYCLOTRON WAVE DOUBLE-STREAM DEVICES

Filed Sept. 8, 1965 7 Sheets-Sheet 5

INVENTOR.
BAYRAM VURAL
BY
Edward J Norton

Aug. 30, 1966 B. VURAL 3,270,241

CYCLOTRON WAVE DOUBLE-STREAM DEVICES

Filed Sept. 8, 1965 7 Sheets-Sheet 6

INVENTOR.
BAYRAM VURAL
BY
Edward J. Norton
Attorney

CYCLOTRON WAVE DOUBLE-STREAM DEVICES

Filed Sept. 8, 1965 7 Sheets-Sheet 7

INVENTOR.
BAYRAM VURAL
BY
Edward J. Norton
ATTORNEY

3,270,241
CYCLOTRON WAVE DOUBLE-STREAM DEVICES

Bayram Vural, Princeton, N.J., assignor to Radio Corporation of America, a corporation of Delaware Filed Sept. 8, 1965, Ser. No. 485,802
20 Claims. (Cl. 315—3)

This is a continuation-in-part of an application filed on December 15, 1961, Serial Number 159,507, now abandoned, by the applicant Bayram Vural for "Cyclotron Wave Double Stream Electron Tubes."

The present invention relates to double-stream amplifiers and oscillator devices, and particularly to cyclotron wave double-stream devices with improved RF coupling means.

Those traveling wave tubes that employ traveling wave interaction between an electron beam and a wave traveling along a slow-wave structure are limited in their power output, especially at very high frequencies, mainly because of the limitations of the slow-wave structures used. Some of the these limitations are:

(1) The diameter of the slow-wave structure is limited to about a wavelength because of moding difficulties;

(2) For a given dimension the output power is limited by the ability of the structure to dissipate the heat produced by beam interception and RF (radio frequency) heating;

(3) The voltages on the structure are limited by breakdown and multipactor effects;

(4) High power output is often incompatible with bandwidth requirements because of the dispersion of the RF structure;

(5) RF losses increase with frequency; and (6) Since the tube tends to oscillate due to feeddback along the slow-wave structure, an attenuator is provided, resulting in reduced gain.

In double-stream tubes, the slow-wave structure is eliminated in the interaction space, and traveling wave interaction between two electron beams or streams is employed. Double-stream amplifier and oscillator tubes that have been proposed involve either space charge wave or cyclotron wave interaction between two electron streams. The streams may be directed in the same or opposite directions, or transverse to each other. Although double-stream tubes avoid the limitations of slow-wave structures in the interaction region, the input and output couplings employed in such tubes have been either slow-wave structures or klystron type gap structures, which retain many of the limitations of conventional traveling wave tubes. Klystron gaps become very small at high frequencies, and limitations (2), (3) and (5) of slow-wave structures apply. Moreover, such gap structures are inhenently narrow band with coupled cavity resonators and very inefficient without resonators.

The object of the present invention is to provide improved methods and means for coupling an electron stream to an input or output fast wave transmission line.

A more specific object of the invention is to provide means for coupling a fast wave in a transmission line to a fast cyclotron wave mode of an electron stream drifting in a magnetic field, without the use of periodic structures.

Another object is to provide an improved double-stream amplifier tube having fast wave input and output couplings.

A further object is to provide a double-stream amplifier tube having inhomogeneous axial magnetic and/or electric fields.

A still further object is to provide an improved double-stream device having fast wave input and output couplings.

These and other objects are accomplished in accordance with one embodiment of the present invention by producing an electron space charge in a given region, establishing a magnetic field along the region, coupling a fast wave transmission line to a first portion of the region to excite a fast cyclotron wave on the space charge in a direction parallel to the magnetic field, adjusting the intensity of the magnetic field in the first portion of the region to a value at which the phase velocity of the fast cyclotron wave therein is substantially equal to the phase velocity of waves along the coupling portion of the transmission line at the operating frequency, and then changing the phase velocity of the fast cyclotron wave to a substantially different value at the same frequency in another portion of the region. The phase velocity may be changed by changing either the magnetic field intensity or the drift velocity (if any) of the space charge in the direction of the fast cyclotron wave. In a double-stream amplifier, for example, the phase velocity of the fast cyclotron wave in the other portion of the region is synchronized with the phase velocity of a slow wave on an electron stream having a drift velocity in a direction substantially parallel to the magnetic field. The electron space charge may be either stationary with respect to the electron stream with which it interacts, in that its drift velocity component parallel to the stream is zero, or may be another electron stream having a drift velocity or a substantial component thereof parallel to the first named stream. The term fast wave transmission line is intended to mean a transmission line adapted to propagate waves at velocities near the velocity of light. The coupled transmission line may be a hollow waveguide or a coaxial line suitably coupled to the space charge to establish the required fast cyclotron wave thereon.

In the accompanying drawings:

FIG. 1 shows the possibilities of interaction between two intermixed electron streams or beams having different drift velocities parallel to a unidirectional magnetic field.

The terms and abbreviations used in the following description are defined as follows (with M.K.S. units):

$f$—frequency (cycles/sec.)
B—magnetic field strength (Webers/meter$^2$)
$e$—electronic charge (coulombs)
$m$—electronic mass (kilograms)
$j_0$—beam current density (amperes/meter$^2$)
$\epsilon_0$—dielectric constant of a vacuum (farads/meter)
$v_0$—beam velocity (meters/sec.)
$v_1$—velocity of beam No. 1
$v_2$—velocity of beam No. 2
$v_g$—group velocity of wave
$v_{ph}$—phase velocity of wave
$c$—velocity of light
$\omega$—angular frequency ($2\pi f$) (radians/sec.)

$\omega_s$—signal frequency
$\omega_c$—cyclotron frequency $(Be/m)$
$\omega_p$—plasma frequency $$\left(\sqrt{\frac{ej_o}{m\epsilon_o v_o}}\right)$$

Figure 1:
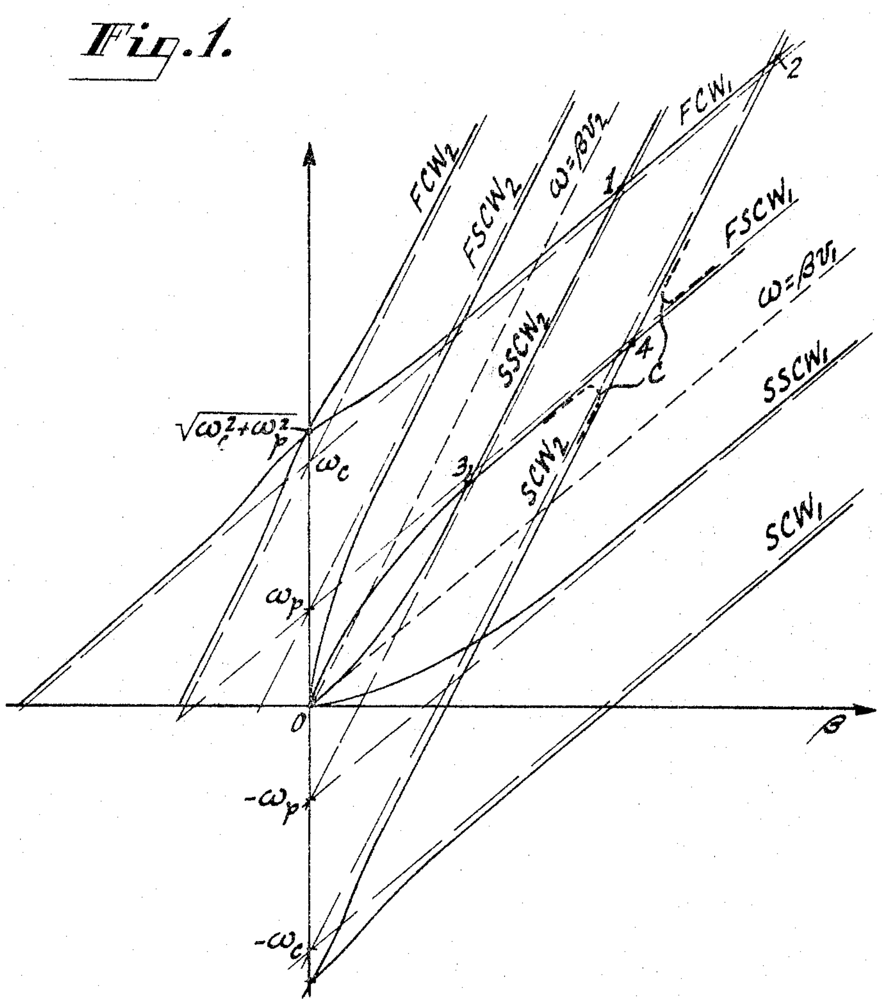
FIGS. 1 through 9 are graphs used in explaining the invention.

$\omega_o$—cut-off frequency of waveguide
$q$—reduction factor for cyclotron waves ($q \geqq 1$)
$p$—reduction factor for space charge waves ($p \leqq 1$)
$\beta$—wave propagation constant (radians/meter)
FCW—fast cyclotron wave
SCW—slow cyclotron wave
FSCW—fast space charge wave
SSCW—slow space charge wave FIG. 1 is an "$\omega$–$\beta$ diagram" or a dispersion diagram, a conventional means for graphically showing the wave propagating characteristics of wave propagating media, such as transmission lines and electron streams. On such a graph, each point represents a particular phase velocity, as determined by the ratio $\omega/\beta$ at that point, and each straight line through the origin represents points of equal phase and group velocity. In FIG. 1, the two short-dash lines, $\omega=\beta v_1$ and $\omega=\beta v_2$, through the origin represent two waves whose phase and group velocities correspond to the velocities $v_1$ and $v_2$ of slow and fast electron beams, in the $\beta$ direction. The four long-dash lines parallel to line $\omega=\beta v_1$ represent waves having the same group velocity $v_1$ but different phase velocities, and correspond to the dispersion of an infinitely thick beam or carrier stream. The four solid curves nearly parallel to the line $\omega=\beta v_1$ are wave propagating characteristic curves of four waves which are excited on the finite dimension slower beam or carrier stream (beam No. 1). The inner two dashed lines intersect the $\omega$-axis at $\omega_p$ and $-\omega_p$ (plasma frequency) and represent space charge waves. The outer two dashed lines intersect the $\omega$-axis at $\omega_c$ and $-\omega_c$ (cyclotron frequency) and represent cyclotron waves. The four solid curves approach the four dashed curves asymptotically at high frequencies.

The solid curves labeled $FSCW_1$ and $SSCW_1$, which start at the origin, are for fast and slow space charge waves having phase velocities above and below the D.C. velocity, $v_1$, of the slow beam. The other two solid curves, $FCW_1$ and $SCW_1$ are for fast and slow cyclotron waves excited on the slow beam in the presence of the magnetic field. At $\beta$=zero, the cyclotron wave curves intersect the $\omega$-axis at $\omega=\pm\sqrt{\omega_c^2+\omega_p^2}$ (calculated for a neutralized beam). This intersection of the cyclotron wave curves with the $\omega$-axis has been shown in FIG. 1, but has been omitted from most of the curves in FIGS. 1 to 8, for simplicity.

The four solid curves, $FSCW_2$, $SSCW_2$, $FCW_2$ and $SCW_2$, nearly parallel to the line $\omega=\beta v_2$ are for the space charge and cyclotron waves excited on the faster beam or carrier stream (beam No. 2), like the waves on the slower beam or carrier stream.

Considering the four waves on each beam in FIG. 1, interaction is theoretically possible between waves of any two intersecting wave characteristic curves. However, the only interaction possibilities that can result in growing waves are those involving interaction between a fast wave on the slow beam and a slow wave on the fast beam. The fast waves on the slower beam play the same role that the circuit waves play in conventional traveling wave tubes, while the power for amplification or oscillation is delivered by the slow waves of the faster beam.

The four growing wave interaction possibilities are indicated in FIG. 1 by numerals 1 to 4. Regions 1 and 2 represent growing wave interaction of the fast cyclotron wave on the slow beam with the two slow waves on the fast beam, while regions 3 and 4 represent similar interaction of the fast space charge wave on the slow beam with the two slow waves on the fast beam. The dotted curves C at region 4, for example, indicate generally the bandwidth in frequency of the region. In general, the nearer the drift velocities of the two beams are to each other, the wider the bandwidth will be. Region 3 is the region of operation of a conventional double-stream space charge wave amplifier tube. All four of the interactions indicated in FIG. 1 are of the "forward wave" type, that is, each of the waves involved has its phase and group velocities in the same direction. If the beams drift in opposite directions, or if one beam is replaced by a stationary electron space charge, the interactions at regions 1 and 2 become "backward wave" type.

The present invention involves interactions 1 and 2, in which one of the waves is the fast cyclotron wave. These interactions occur at higher frequencies than the conventional double-stream interaction, for a given set of beam parameters. In addition, the use of the fast cyclotron wave makes it possible to achieve fast wave coupling of the input and output transmission lines to one of the beams. The phase velocities of cyclotron waves are given by:

$$v_{ph_{SCW}}=\frac{v_o}{1\pm\frac{q\omega_c}{\omega}} \qquad (1)$$

and the phase velocities of space charge waves are given by:

$$v_{ph_{SCW}}=\frac{\omega_o}{1\pm\frac{q\omega_p}{\omega}} \qquad (2)$$

where the minus sign is valid for fast waves and the plus sign is valid for the slow waves. At frequencies where $\omega$ is large compared to both $\omega_p$ and $\omega_c$, or if the beam is relatively large, the reduction factors $q$ and $p$ are nearly unity, and hence, Equations 1 and 2 can be approximated as follows:

$$v_{ph_{CW}}=\frac{v_o}{1\pm\frac{\omega_c}{\omega}} \qquad (3)$$

$$v_{ph_{SCW}}=\frac{v_o}{1\pm\frac{\omega_p}{\omega}} \qquad (4)$$

The phase velocities of the space charge waves are close to the drift velocity, $v_o$, of the beam. Thus, the drift velocity, $v_o$, is the only important parameter by which the phase velocity of the space charge waves can be influenced. On the other hand, since $\omega_c/\omega$ can have practically any value, the phase velocity of the cyclotron waves can easily be influenced by changing the magnetic field strength.

Figure 2:
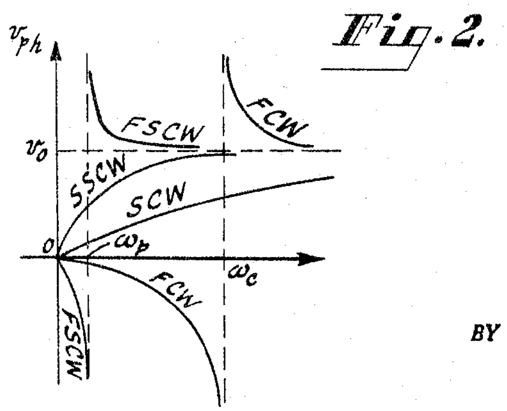

FIG. 2 shows the variation of the phase velocity with frequency of the cyclotron and space charge waves on a thick beam or stream having a drift velocity $v_o$ and plasma frequency $\omega_p$ in a magnetic field having a cyclotron frequency $\omega_c$.

Figure 3:
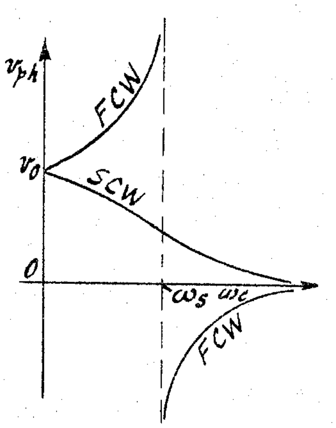

FIG. 3 shows the variation of the phase velocity of the two cyclotron waves of frequency $\omega_s$ on a beam of velocity $v_o$ as the cyclotron frequency $\omega_c$ is varied, by varying the magnetic field strength.

Figure 4:
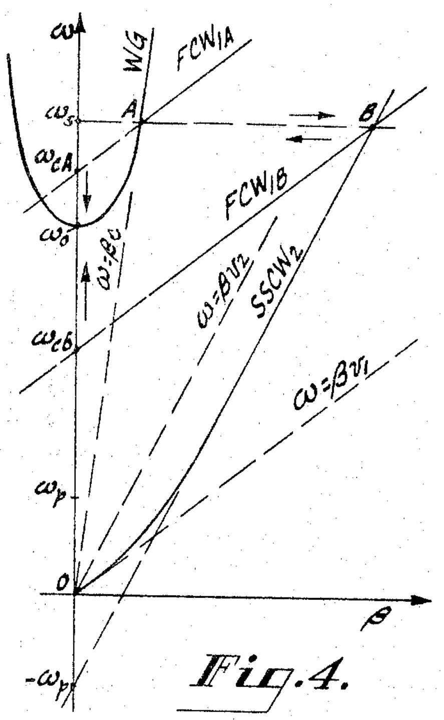
Figure 10:
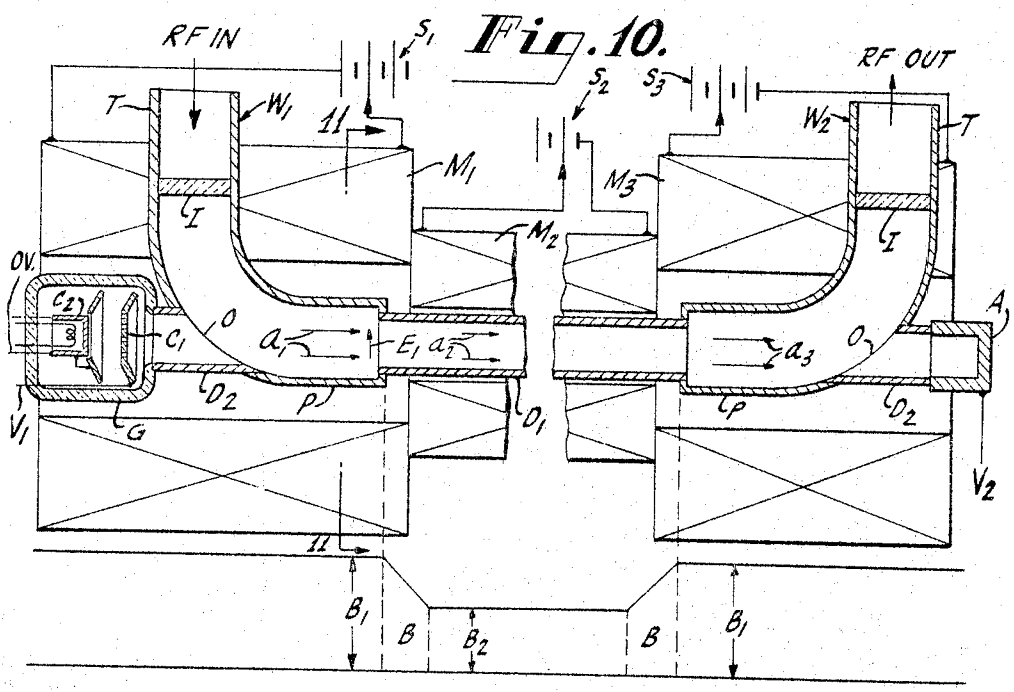
FIG. 10 is a longitudinal sectional view of a double-stream amplifier tube embodying the invention.
Figure 11:
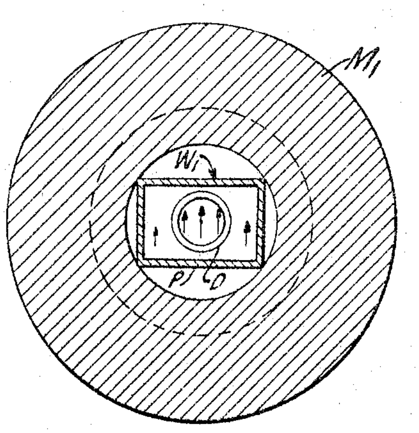
FIG. 11 is a transverse sectional view on line 11—11 of FIG. 10.

FIG. 4 shows graphically how a fast electromagnetic wave of given signal frequency $\omega_s$ traveling in a hollow wave guide can be coupled to the fast cyclotron wave mode of a slower electron beam of velocity $v_1$ in a magnetic field, in an electron tube such as that shown in FIG. 10, for example. The parabola-shaped solid curve WG shown is the wave propagating characteristic of the wave-guide, which has a cut-off frequency $\omega_o$. The phase velocity in the wave guide is infinite at $\omega_o$ and approaches the velocity of light (dashed line $\omega=\beta C$) as the frequency increases. A dashed constant frequency line is drawn through $\omega_s$ intersecting the WG curve at point A. Then a fast cyclotron wave curve $FCW_{1A}$ is drawn through point A parallel to the $v_1$ line, determining the cyclotron frequency $\omega_{cA}$ in the input coupling region. This means that when the magnetic field in the coupling region is adjusted to a value $B_1$ such that $B_1e/m=\omega_{cA}$, maximum coupling between the fast signal wave and this fast cyclotron wave mode will occur (because the waves have the same phase velocity at point A). Since the phase velocity at point A is greater than the velocity of light, the wave $FCW_{1A}$ cannot be practically used, as is, in a microwave tube. However, by reducing the magnetic field strength along the beam path to a substantially lower $\omega_c$ in another region the phase velocity of this wave can be reduced to a useful value in the other region.

Figure 18:
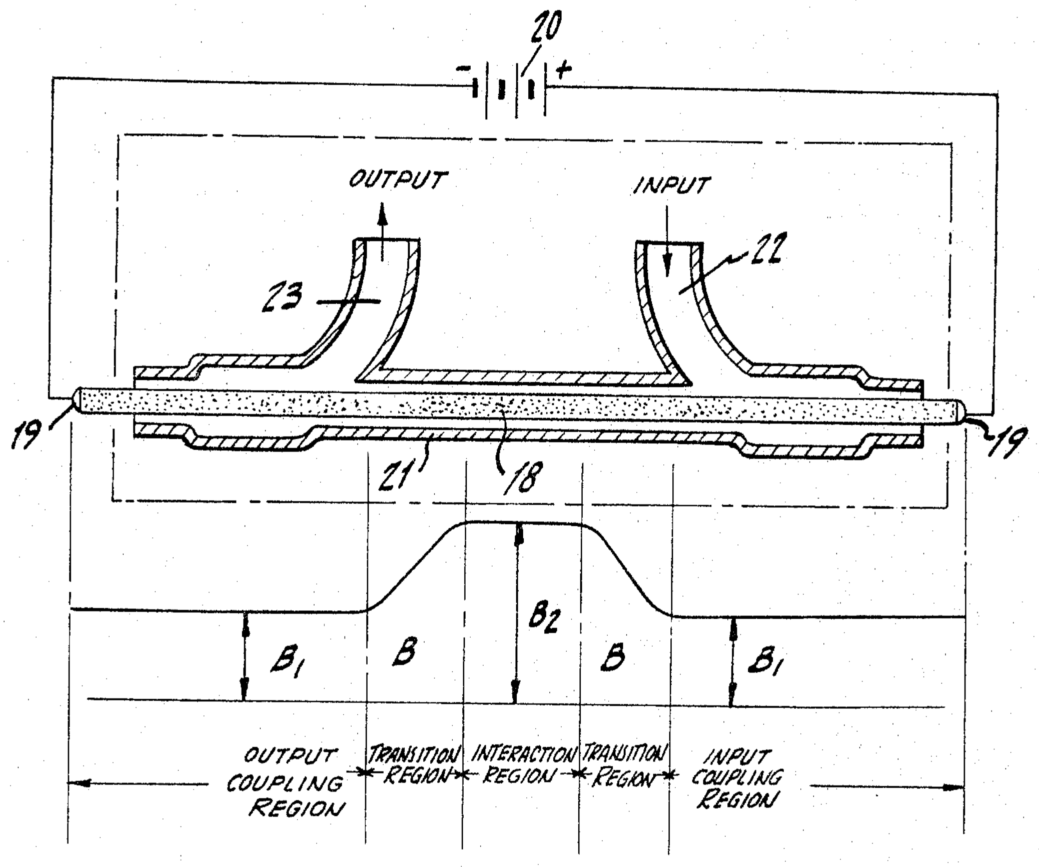
FIG. 18 is a longitudinal sectional view of a double-stream solid state device embodying the invention.

FIG. 4 shows how this fast cyclotron wave $FCW_{1A}$ on the slow beam can be converted to a fast cyclotron wave $FCW_{1B}$ having the same phase velocity at the signal frequency $\omega_s$ as the slow space charge wave $SSCW_2$ on a faster beam drifting in the same direction as the first beam and mixed therewith, for growing wave interaction with the faster beam. Graphically, this involves merely extending the $\omega_s$ line to intersect the $SSCW_2$ curve at point B, and drawing an $FCW_{1B}$ curve through B parallel to the $v_1$ line, thus determining $\omega_{cB}$, the new cyclotron frequency, and hence, the magnetic field strength, in the interaction region. In a double-stream amplifier tube, as shown in FIG. 10 or a semiconductor amplifier as shown in FIG. 18, the best values of $\omega_{cA}$ and $\omega_{cB}$ are determined experimentally, by adjusting the magnetic field strengths in the two regions to obtain optimum interaction and gain.

The upper arrows of the pairs of short arrows shown in FIG. 4 indicate the decrease in cyclotron frequency and phase velocity associated with coupling an input waveguide to the beams. At the output coupling region, the procedure is exactly the reverse of that at the input coupling, as indicated by the lower short arrows in FIG. 4.

In the above description, a given slow beam velocity $v_1$ was assumed. If, instead, a given $\omega_{cA}$ is desired, $FCW_{1A}$ is drawn through point A and the given $\omega_{cA}$, and the slope of the straight portion of $FCW_{1A}$ determines the necessary value of slow beam velocity $v_1$.

In FIGS. 10–17 the cathodes for the slow and fast beams or streams are designated $C_1$ and $C_2$ respectively.

The tube in FIG. 10 comprises input and output waveguide sections $W_1$ and $W_2$, respectively, of rectangular cross-section, connected in vacuum tight relation by a hollow cylindrical drift tube $D_1$. As shown, each of the sections $W_1$ and $W_2$ includes a beam coupling portion P aligned with the drift tube $D_1$ and a terminal portion T adapted to be connected to an external waveguide. A signal wave propagated in the $TE_{01}$ mode in the input waveguide $W_1$ will establish a transverse RF electric field in the coupling portion P as shown by arrows $E_1$. The drift tube $D_1$ is dimensioned below cut-off over the desired operating frequency band to prevent propagation of waves therethrough, as a waveguide. The sections $W_1$ and $W_2$ are provided with openings O and associated drift tubes $D_2$, also below cut-off, for the passage of electron beams therethrough.

Aligned with the openings O and drift tube $D_2$ of the input waveguide section $W_1$ is an electron gun structure comprising a thermionic cathode $C_2$ for the fast beam and a cathode $C_1$ for the slow beam. Cathode $C_1$ may be in the form of a grid mounted in the path of electrons from thermionic cathode $C_2$, as shown. Emission from $C_1$ may be thermionic electrons produced by heating $C_1$, by electron bombardment or by a heater.

As the beams from cathodes $C_1$ and $C_2$ pass through the coupling section $W_1$, the electrons are subjected to the transverse RF electric field $E_1$, which causes them to spiral in the axial magnetic field at the cyclotron frequency $\omega_{cA}$ of the magnetic field $B_1$. After traveling through the sections $W_1$ and $W_2$ and drift tube $D_1$, the beams are collected by an anode A sealed to the drift tube $D_2$ on the output section $W_2$. The vacuum envelope of the tube may be completed by a glass bulb section G, enclosing the electron gun structure, and wave-permeable insulating seals I in the waveguide sections $W_1$ and $W_2$.

The axial magnetic field required for the cyclotron wave modes may be provided by three adjustable magnetic solenoids $M_1$, $M_2$ and $M_3$, coaxially surrounding the tube, as shown. The magnetic field strengths of the solenoids are adjusted by varying the magnetizing currents, as by means of variable voltage D.C. sources, $S_1$, $S_2$ and $S_3$, connected thereto. Solenoid $M_1$ establishes a magnetic field of strength $B_1$ along the gun and input coupling regions; solenoid $M_2$ establishes a field of strength $B_2$ along most of the beam interaction region of the drift tube D; and solenoid $M_3$ establishes a field of strength $B_1$ (same as $M_1$) in the output coupling and anode regions. Appropriate transition regions of variable magnetic field strength B are produced between the $B_1$ and $B_2$ regions.

In operation, D.C. potentials are preferably applied to the tube electrodes as follows: cathode $C_2$ at zero volts; cathode $C_1$ at $V_1$ volts; and the structure comprising the waveguide sections, drift tubes and anode at $V_2$ volts. Under these conditions, the drift velocity of the fast beam is $V_2$ volts, and that of the slow beam is $V_2-V_1$ volts. $V_1$ and $V_2$ are adjustable to establish convenient beam velocities. As explained in connection with FIG. 4, the magnetic field strength $B_1$ in the input coupling region is adjusted so that the phase velocity of the fast cyclotron wave mode ($FCW_{1A}$) on the slower beam (from $C_1$) is equal to the high phase velocity of the fast input wave at the desired operating frequency $\omega_s$. These equal high phase velocities are indicated by the long arrows $a_1$ in FIG. 10. The shorter arrows $a_2$ indicate the equal, lower phase velocities of the converted fast cyclotron wave ($FCW_{1B}$) and the slow wave (e.g. $SSCW_2$) on the faster beam in the interaction region of the tube. The long arrows $a_3$ indicate the equal high phase velocities of the fast output wave and the cyclotron wave in the output coupling region of $W_2$, after reconversion from $FCW_{1B}$ back to $FCW_{1A}$.

Figure 5:
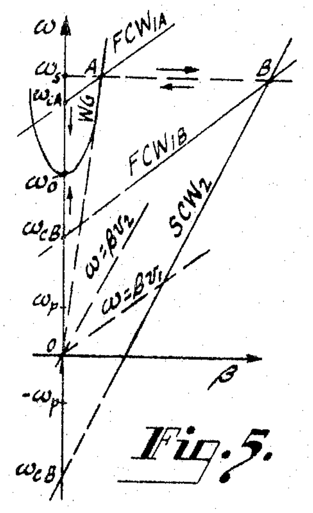

FIG. 5 shows graphically how the fast cyclotron wave $FCW_{1A}$ on a slow beam, after excitation by the signal wave, can be converted to a cyclotron wave $FCW_{1B}$ having the same phase velocity at the operating frequency as the slow cyclotron wave $SCW_2$ on the faster beam, instead of the slow space charge wave. For given $\omega_s$, $v_1$, and $\omega_{cB}$, point A and curve $FCW_{1A}$ are determined as in FIG. 4. Then, curve $FCW_{1B}$ is drawn parallel to $FCW_{1A}$, intersecting the $\omega_s$ line at B. Then, the $SCW_2$ curve is drawn through B and $-\omega_{cB}$, determining the velocity $v_2$ of the faster beam. The gain for the interaction of FIG. 4 is higher for thick beams, while the gain for the interaction of FIG. 5 is higher for thin beams. Thus, FIG. 4 is better for power tubes and FIG. 5 is better for low power, low noise tubes.

Figure 6:
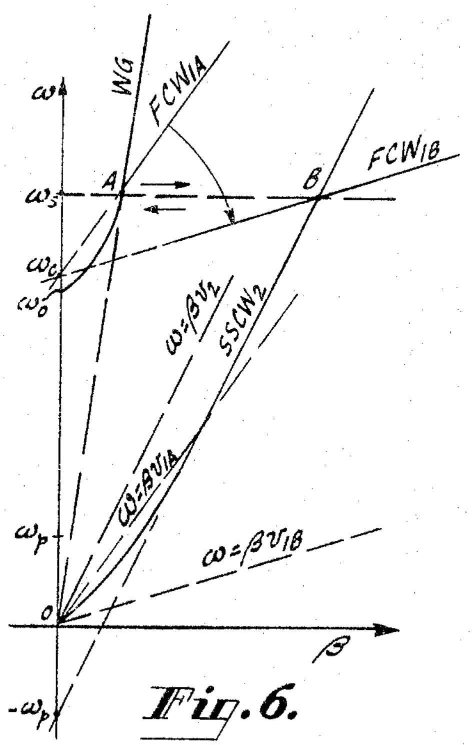

FIG. 6 shows graphically how the phase velocity of the fast cyclotron wave $FCW_{1A}$ on one beam, after excitation by the signal wave, can be reduced from the value at A to the value at B by changing the drift velocity of the first beam, instead of the cyclotron frequency as in FIG. 4, for interaction with the slow space charge wave $SSCW_2$ on the second beam. For given $\omega_s$, $\omega_c$, $\omega_p$, (initial velocity) $v_{1A}$, the curve $SSCW_2$ and the $\omega_s$ line are drawn, determining points A and B. Then, curve $FCW_{1A}$ is drawn through A and $\omega_c$, and curve $FCW_{1B}$ is drawn through B and $\omega_c$. The slope of $FCW_{1B}$ determines the new drift velocity $v_{1B}$ of the first beam, and the angle and curved arrow between $FCW_{1A}$ and $FCW_{1B}$ represent the required change in beam velocity between the coupling region and the interaction region. In this case, the magnetic field is uniform throughout the coupling and interaction regions. It will be understood that the first beam could be either faster or slower than the second beam, in this case.

Figure 12:
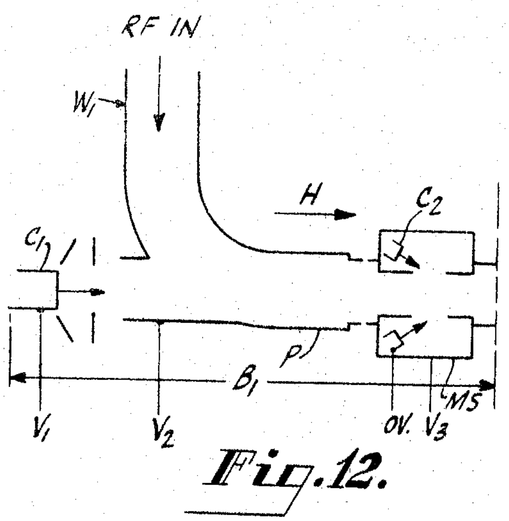
FIGS. 12, 13 and 14 are schematic views of modifications incorporating the invention.

FIG. 12 shows schematically the input portion of a double-stream amplifier tube, designed for operation as in FIG. 6, comprising an input wave guide section $W_1$, slow beam cathode $C_1$ and a fast beam cathode $C_2$. Cathode $C_2$ is positioned beyond the section $W_1$ and surrounded by a magnetic shield MS which is insulated from the section $W_1$ and maintained at a different, adjustable potential $V_3$. The new drift velocity $v_{1B}$ of the slow beam (from $C_1$) is $V_3-V_1$ volts. The magnetic means for establishing the uniform axial magnetic field $B_1$ is indicated schematically by the arrow H.

Figure 7:
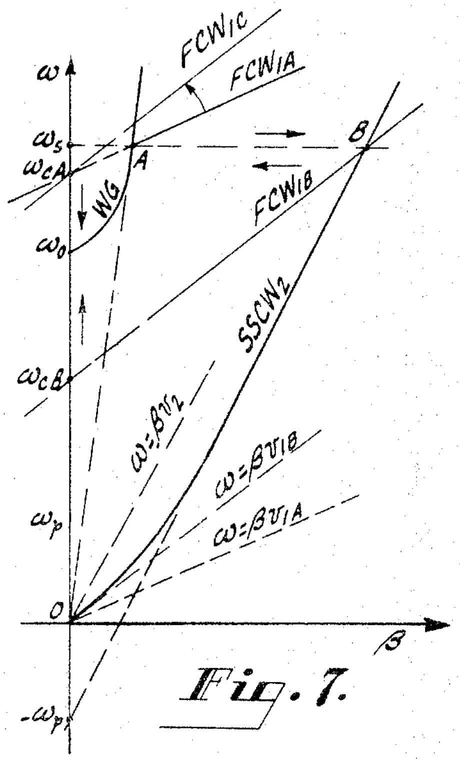

FIG. 7 shows a combination of FIGS. 4 and 6, in which both the cyclotron frequency and the beam velocity are changed. For given $\omega_s$, $\omega_{cA}$, $\omega_{cB}$, and $v_2$, points A and B are determined as in FIG. 4. The, curve $FCW_{1A}$ is drawn through A and $\omega_{cA}$, determining $v_{1A}$, and curve $FCW_{1B}$ is drawn through B and $\omega_{cB}$, determining $v_{1B}$. Then, curve $FCW_{1C}$ may be drawn through $\omega_{cA}$ parallel to $FCW_{1B}$ to indicate the required change (increase) in the velocity of the first beam for the given change (decrease) in cyclotron frequency, $\omega_{cA}-\omega_{cB}$, to convert $FCW_{1A}$ to $FCW_{1B}$.

Figure 8:
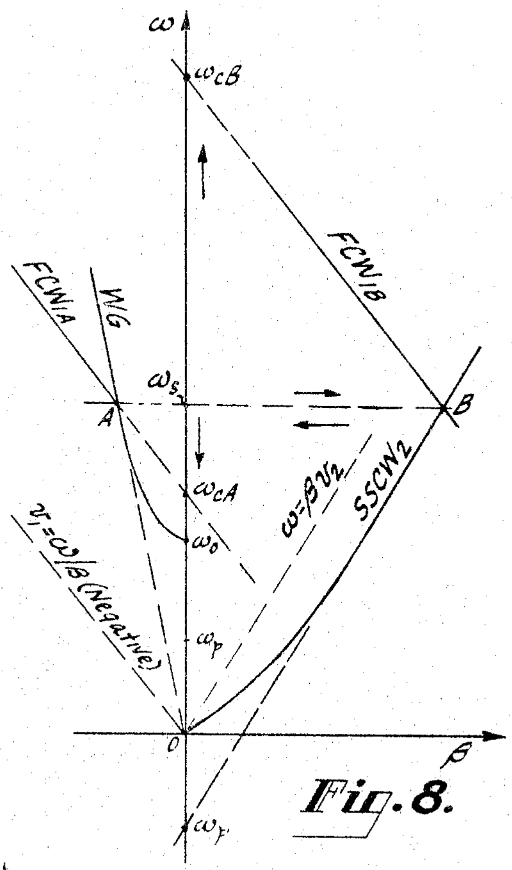

FIG. 8 shows graphically the coupling of a fast wave in a waveguide to a double-stream amplifier tube of the backward wave type.

Figure 13:
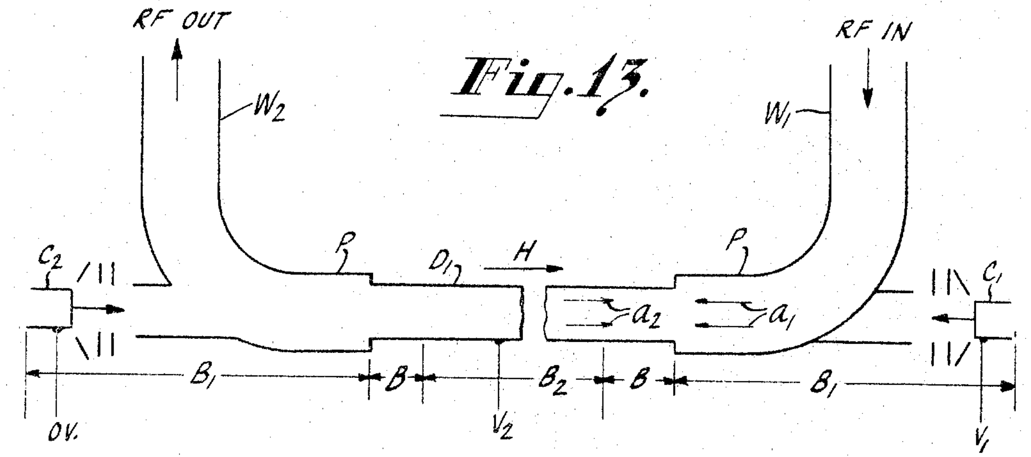

A backward wave amplifier tube is shown schematically in FIG. 13 in which two beams are projected in opposite directions from the cathode $C_1$ and $C_2$ past the coupling portions of input and output waveguide sections $W_1$ and $W_2$ respectively. The direction of (slow) beam No. 2 from cathode $C_2$ (left to right in FIG. 13) is taken as the positive $\beta$-direction in FIG. 8. Therefore, the velocity of beam No. 2 is positive and that of beam No. 1 is negative in FIG. 8, as shown by the slope of the $v_2$ and $v_1$ lines. The RF input wave in the waveguide section $W_1$ is a "forward wave" with its group and phase velocities in the same direction, which is negative in the coupling region parallel to the beam paths. Hence, the left half of the waveguide curve WG in FIG. 8 (in the second quadrant) must be used, as shown. For given $\omega_s$, $\omega_p$, $v_1$ and $v_2$, the $\omega_s$ line is drawn, establishing points A and B. Then the fast cyclotron wave curve $FCW_{1A}$ is drawn through A parallel to the $v_1$ line. Maximum coupling between the signal wave and this cyclotron wave occurs at point A, because their phase velocities are identical in direction and speed as shown by the arrows $a_1$ in FIG. 13. For values of $\omega$ greater than $\omega_{cA}$ (the portion of $FCW_{1A}$ in the second quadrant), this cyclotron wave is a "forward wave," with both group and phase velocities negative (energy carried from right to left in FIG. 13). For values of $\omega$ less than $\omega_{cA}$ (in the first quadrant), $FCW_{1A}$ is a "backward wave," with a positive phase velocity and a negative group velocity at each frequency.

In order to achieve growing wave interaction between the fast cyclotron wave on beam No. 1 and the slow space charge wave on beam No. 2, $FCW_{1A}$ is converted to a backward cyclotron wave $FCW_{1B}$ having the same phase velocity at the signal frequency (point B) as the slow space charge wave $SSCW_2$, by increasing the field strength of the magnetic field in the interaction region to establish a different cyclotron frequency $\omega_{cB}$ in that region. Graphically, in FIG. 8 curve $FCW_{1B}$ is drawn through point B parallel to $FCW_{1A}$, determining $\omega_{cB}$. The equal phase velocities at B are shown by arrows $a_2$ in FIG. 13. As in the other figures, the upper arrows in FIG. 8 represent the input coupling, and the lower arrows represent the output coupling where FCW $_{1B}$ is converted back to $FCW_{1A}$, which is then coupled to the output waveguide $W_2$. The two beams may have the same or different speeds.

Figure 9:
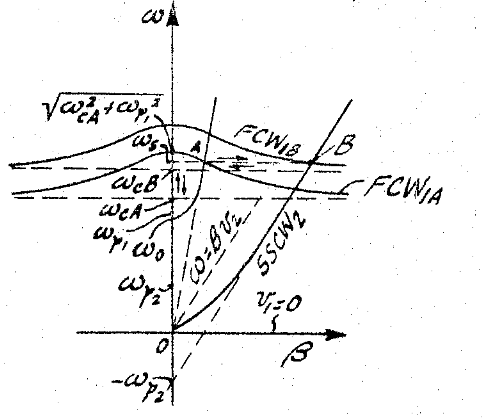

FIG. 9 shows graphically the coupling of a fast wave to a double-stream amplifier tube having a first electron stream drifting in a given direction and a second electron stream drifting through the first stream at right angles thereto, so that the velocity component of the first stream in the direction of the second stream is zero. In this case, different plasma frequencies, $\omega_{p_1}$ and $\omega_{p_2}$, are used. The direction of the second stream is taken as the positive $\beta$-direction. The zero velocity of the first stream is indicated by the horizontal axis (zero slope). For given $\omega_s$, $\omega_{p_1}$, $\omega_{p_2}$, $\omega_{cA}$ and $v_2$, the curve $FCW_{1A}$ is drawn (using $\omega_{p_1}$ with the straight end portions horizontal (zero drift velocity), and the middle portion crossing the $\omega$-axis at $$\omega\sqrt{\omega_{cA}^2+\omega_{p1}^2}$$

The $SSCW_2$ curve (using $-\omega_{p_2}$) and $\omega_s$ line are drawn, establishing point A and B. Then, the curve $FCW_{1B}$ is drawn through B, establishing $\omega_{cB}$.

Figures 14, 15, 16:
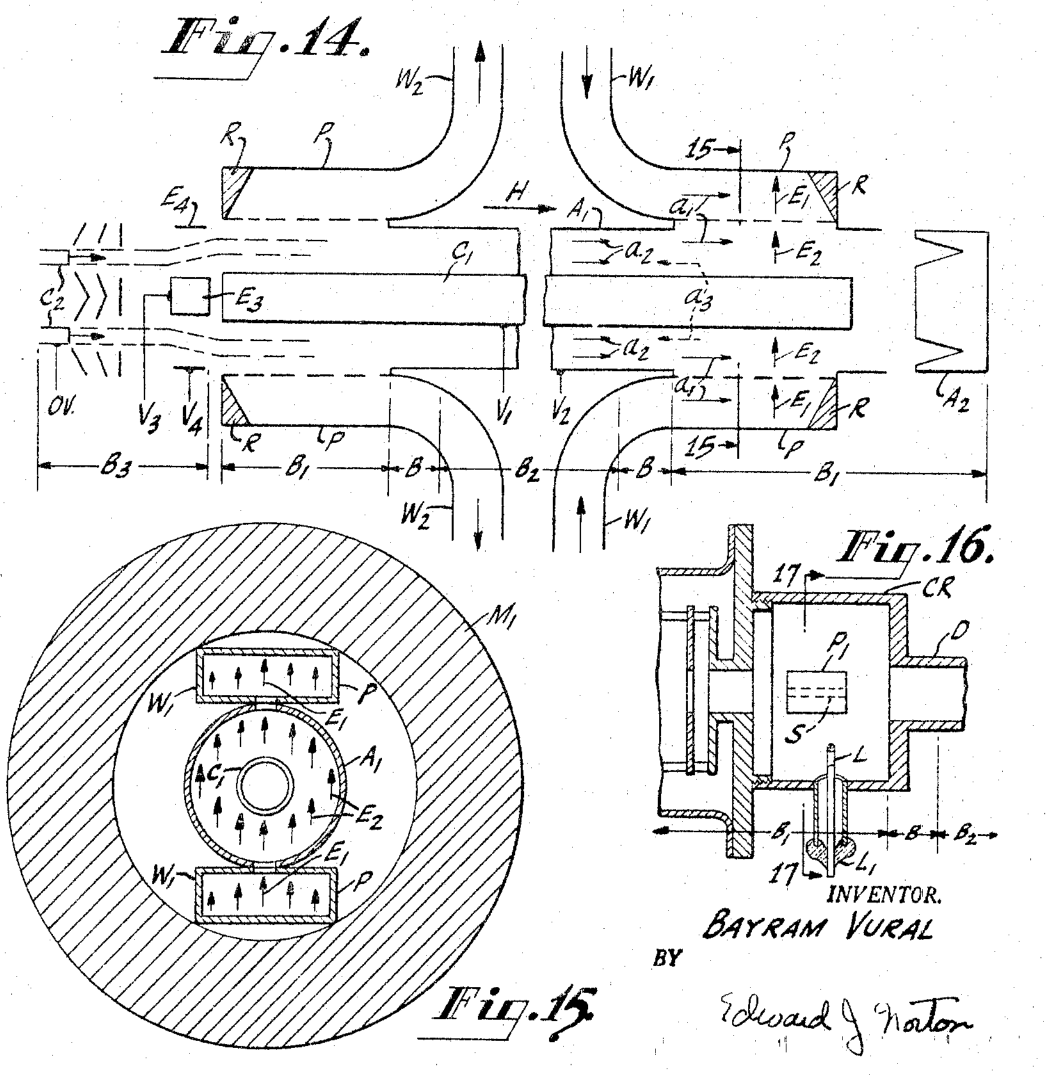
FIG. 15 is a transverse sectional view taken on line 15—15 of FIG. 14.
FIG. 16 is a fragmentary axial sectional view of a tube having an alternative type of coupling.

FIGS. 14 and 15 show a double-stream amplifier tube designed for operation as shown in FIG. 9. In FIG. 14, a central elongated cylindrical cathode $C_1$ is concentrically surrounded by a hollow cylindrical anode structure $A_1$ to provide a magnetron diode section, in the axial magnetic field H, when the anode is biased at a positive potential $V_2$ relative to the cathode $C_1$ at $V_1$. The end portions of the anode structure $A_1$ are apertured on opposite sides, as shown, for direct coupling of the cathode-anode space to axially-extending, coupling portions P of input and output waveguide sections $W_1$ and $W_2$. Each of the waveguide sections $W_1$ and $W_2$ comprises two allochiral or symmetrically opposed parts on opposite sides of the anode A. The two parts of the input waveguide section $W_1$ are adapted to be coupled, by conventional means, to an RF source (not shown) in such manner as to excite RF electric fields in the two parts in the same direction at any instant, as shown by the arrows $E_1$ in FIGS. 14 and 15. The fields $E_1$ are coupled to the space between $C_1$ and $A_1$ to excite RF electric fields $E_2$, which cause the electrons therein to oscillate at the cyclotron frequency of the magnetic field. The two parts of the output waveguide section $W_2$ are similarly adapted to be coupled to an output transmission line (not shown) to deliver power to a load. Each of the waveguide coupling portions P is terminated by resistive material R to prevent wave reflections. Similar resistive terminations may be provided in FIGS. 10–13.

A hollow beam of electrons is injected into the annular space between $C_1$ and $A_1$ by an electron gun comprising a ring cathode $C_2$ and suitable focusing and accelerating electrodes mounted at the output end of the tube, as shown in FIG. 14. In order to focus or stabilize the hollow beam in the radial D.C. electric field between $C_1$ and $A_1$, a coaxial electron deflecting system, comprising inner and outer electrodes $E_3$ and $E_4$, is interposed between cathode $C_2$ and cathode $C_1$. Electrodes $E_3$ and $E_4$ are biased at suitable D.C. potentials to establish a radial electric field in the path of the hollow beam and cause the electrons to spiral about the central axis in the axial magnetic field. The parameters are adjusted so that the inward magnetic force on each electron in the magnetron region balances the outward electric field and outward centrifugal force. The hollow beam is eventually collected by an anode $A_2$ mounted at the input end of the tube.

The velocity component of the hollow beam in the axial direction in the interaction space must be matched with the space potential seen by the beam. The velocity component of the magnetron space charge in the axial direction is zero. The successive regions of magnetic field strength $B_3$, $B_1$, B, $B_2$, B and $B_1$, in FIG. 14 may be established by solenoids, as in FIG. 10. The field strength $B_3$ in the gun region of the hollow beam may be the same as $B_1$, or different.

In operation, two fast waves of the desired signal frequency $\omega_s$ in the two coupling portions P of the input waveguide section $W_1$ are simultaneously coupled to the fast cyclotron wave mode $FCW_{1A}$ on the magnetron type space charge between $C_1$ and $A_1$, as indicated by the equal phase velocity arrows $a_1$ (point A in FIG. 9). Although the phase velocity of the $FCW_{1A}$ wave at point A is positive (in the first quadrant), the group velocity of this wave is negative (negative slope), and hence, this wave in a backward wave carrying energy from right to left in FIG. 14, as shown by the dotted arrows $a_3$. The coupling between the converted fast cyclotron wave $FCW_{1B}$ and the slow wave on the hollow beam in the interaction region is indicated by the shorter equal phase velocity arrows $a_2$ (point B in FIG. 9).

Figure 17:
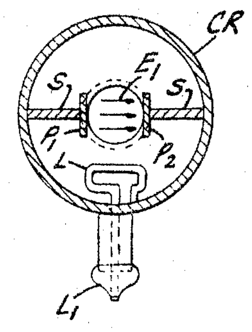
FIG. 17 is a transverse sectional view taken on line 17—17 of FIG. 16.

Other types of transmission lines and coupling sections can be used in the practice of the invention. For example, FIGS. 16 and 17 show a coaxial line coupled to the electron beam in the tube by means of a cavity resonator type of coupling section. The coupling comprises a hollow cylindrical cavity resonator CR interposed between the last electrode of the electron gun and the drift tube D and forming a part of the tube envelope. Mounted within the resonator by two conductive supports S are two juxtaposed deflection plates or poles $P_1$ and $P_2$. The resonator is coupled by a coupling loop L to an input coaxial line $L_1$. By coupling of the loop L to the RF magnetic field within the resonator, the input signal wave on line $L_1$ establishes a standing wave RF electric field extending between the resonator poles $P_1$ and $P_2$, as indicated by arrows $E_1$ in FIG. 17. This field $E_1$ excites a fast cyclotron wave $FCW_{1A}$ of infinite phase velocity at the operating frequency on the slower beam if the magnetic field is adjusted to make $$\sqrt{\omega_{cA}^2+\omega_p^2}=\omega_s$$

For a given $\omega_s$, $\omega_p$, $v_1$ and $v_2$, the coupling can be shown graphically on an $\omega-\beta$ diagram as in FIGS. 1 to 9 by drawing the $FCW_{1A}$ curve for beam velocity $v_1$ through $\omega_s$ on the $\omega$-axis, and then drawing curve $FCW_{1B}$ through point B parallel to curve $FCW_{1A}$ and the $v_1$ line, thus determining the cyclotron frequency $\omega_{cB}$ (and magnetic field $B_2$) at which the wave $FCW_{1B}$ will couple to the slow space charge wave $SSCW_2$ on the faster beam in the interaction region of the drift tube D.

It is known in the microwave art that drifting free charge carriers in solids, such as in semiconductors, for example, Indium Antinomide (InSb), Indium Arsenide (InAs), and in semi-metals such as bismuth, for example, will support electrokinetic waves, like an electron stream in vacuum, and also especially cyclotron waves, whose phase velocity is a function of the strength of the applied magnetic field. In fact the cyclotron frequency, $\omega_c$, for free carriers in solids is given by:

$$\omega_c=\frac{eB_0}{m^*} \qquad (5)$$

where $m^*$ is the effective mass of the free carrier.

Equation 5 is identical to that given for tube devices.

The plasma frequency, $\omega_p$, of the free carriers in a solid is defined similarly by $$\omega_p=\left(\frac{Je}{m^*\epsilon_o V_D}\right)^{1/2} \qquad (6)$$

This equation is identical to that given in the specification for tube devices except where $V_D$=drift velocity of the carriers in solid in meter/sec.
$J$=carrier current density in Amp./meter$^2$ The difference between a stream of carriers in vacuum and in a solid is that the carriers in a solid are subject to frequent collisions. However, it can be shown that the collisions do not change the nature of the electrokinetic waves, but they do introduce loses. Hence in a two-stream system subject to collisions, in order to obtain net gain, the interaction must be strong enough to overcome the losses introduced by collisions.

The effect of collisions can be reduced in two ways; first by reducing the collision frequency, i.e. by working at low temperatures; secondly by increasing the strength of the interaction, i.e. by increasing the $\omega_p$'s of both streams. This can be accomplished by subjecting the solid to high electric fields or by proper doping. In solids both of these possibilities exist. Therefore double stream interactions in solids can be described in the same manner, as the double-stream interactions in vacuum (in tubes). Hence Equations 3 and 4 above apply to streams in solid state materials as well. Thus, the phase velocity of the cyclotron-waves supported by the drifting carriers in solids can be controlled by the applied magnetic field in the same manner as in the tube devices.

Several combinations of double-stream systems can be utilized in solids for coupling such as (1) electron streams to hole streams, (2) electron streams to electron streams, (3) hole streams to hole streams.

Therefore, due to the presence of these various streams of electrons and holes, dispersion or "$\omega-\beta$" diagrams for solid state devices could be drawn as those for the tube devices indicated in FIGURES 1 to 9. Each of these dispersion diagrams necessarily have their solid state counterpart, with the exception that one, in general, speaks of holes and electrons or carrier streams as the circuit modes and signal modes. These modes carried by the electron streams and holes streams can react with and synchronize with electromagnetic waves under the influence of an applied longitudinal magnetic field. The results achieved and the manner of implementation are similar to those for the tube devices except for the materials used.

Hence in a solid the fast cyclotron wave as described in the specification could be supported by holes and the slow cyclotron wave could be supported by electrons. The fast cyclotron wave supported by holes serves as the circuit modes and the phase velocity of these modes can be controlled by the magnetic field as can the phase velocity of the cyclotron electron beam wave as previously explained.

If reference is made to FIGURE 18, there is shown a solid 18, which may be indium antinomide or indium arsenide or some other suitable material. The solid state device may be placed in a suitable refrigerated environment 30 shown by dotted lines at liquid nitrogen or another suitable temperature depending on the material used. Attached to each end of the solid 18 are two contacts 19, which may be placed on the solid 18, by the vapor deposition technique or other suitable methods. The contacts 19 are brought out and connected across a battery 20. The battery is analogous to the thermionic cathodes of the beam devices and acts as a source of carriers. These carriers in solids are commonly referred to as holes or electrons. The solid material 18, is surrounded by a metal conductor 21, such as copper etc., which serves to prevent the loss of energy by radiation from the solid 18. There is shown an input waveguide 22, which can support a fast electromagnetic wave. The shape of the input waveguide although rectangular in the figure, could be circular, elliptical or another shape depending on the type of electromagnetic wave it is to support. The electromagnetic wave present in the input waveguide 22, can be synchronized or coupled with the fast cyclotron wave of the holes by use of a magnetic field. The magnetic field profile is shown beneath and longitudinal to the solid 18. The magnetic field profile can be produced in the same manner as previously described and means of obtaining such a profile need not be elaborated upon here. The value of the magnetic field $B_1$ at the input coupling portion of the device is chosen so that the fast cyclotron wave has a phase velocity equal to the phase velocity of the electromagnetic wave present in the input wave guide 22. It is known in the art that two waves with equal velocities will couple with each other, that is, energy is transferred from one to the other and one wave is enhanced or "grows" at the expense of the other. Hence in this case the energy from the input electromagnetic wave will be transferred to the drifting hole stream supporting the fast cyclotron wave. After the energy is coupled or transferred, the fast cyclotron wave is slowed down in the transition region by varying the magnetic field B until the value of $B_2$ is obtained. At this value the fast cyclotron wave supported by the holes obtains the same velocity as the negative energy carrying modes or the slow cyclotron wave supported by the electrons. This slow cyclotron wave now carries the energy of the input electromagnetic wave because of the energy transfer from the fast cyclotron wave to the slow cyclotron wave. The process is now repeated and the amplified electromagnetic wave is coupled out via output waveguide 23. It is to be noted that the metal conductor envelope 21 is stepped near the vicinity of the contacts 19 to prevent coupling of the input and output waves to free space. The device described is a backward wave amplifier and the dispersion diagram of FIG. 2 shows the coupling points.

Figure 19:
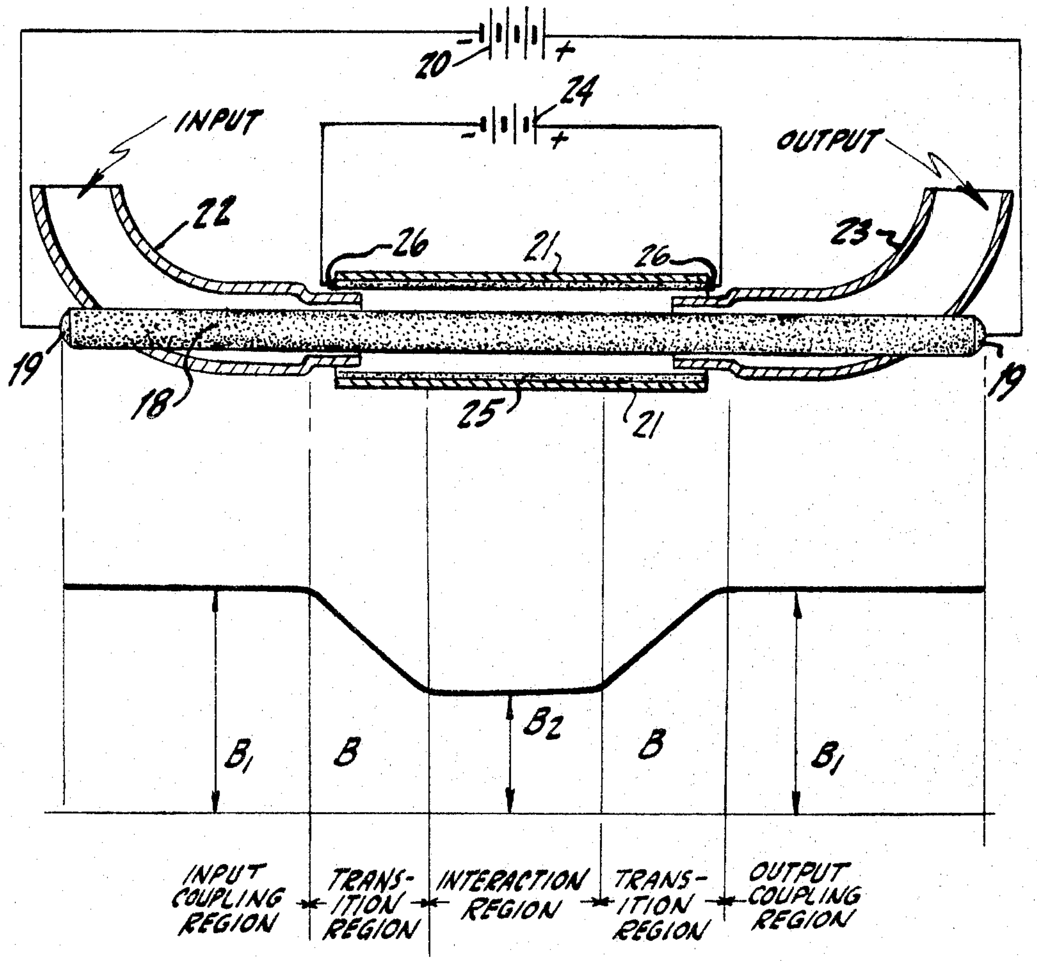
FIG. 19 is a longitudinal sectional view of another double-stream solid state device embodying the invention.

FIGURE 19 shows a semiconductor forward wave amplifier which operates in the manner of the tube device shown in FIGURE 10. Like parts are assigned the same numerals for a clearer presentation. Reference numeral 18 represents a solid as described above and at both ends are contacts 19 which enable coupling to a D.C. supply 20. The function of the supply 20 is to provide a source of carriers. In this case the carriers that are to be coupled to are electron streams. Surrounding the center portion of solid 18 is a cylindrical ring 25 also composed of a solid semiconductor or semimetal material. As in FIG. 18, a metal conductive shield 21 is provided. The spacing shown on the figure between element 25 and element 18 is exaggerated and they are much closer in actual practice. In fact, the closer they are the more efficient will be the coupling hereinafter described. The ends of the cylindrical ring 25 are coated with a suitable material and a contact 26 is brought out at each end. A D.C. source of potential 24 is applied across the cylindrical ring 25 to provide a source of carriers as previously explained. Hence electron streams flow through the cylindrical ring 25. It is to be noted that the electron streams in solids 18 and 25 drift in the same direction because of the battery polarity. If the polarity of the batteries 20 and 24 were opposite the streams would drift in the opposite direction and backward wave coupling could be implemented.

There is shown an input waveguide 22 which is capable of supporting an electromagnetic or fast wave. The electromagnetic wave which is present in the input waveguide is caused to couple with a fast cyclotron wave in semiconductor 18, the cyclotrons wave's phase velocity is controlled by the magnetic field $B_1$, indicated on the magnetic field profile. The coupling of the fast electromagnetic wave and the fast cyclotron wave takes place in the region of the semiconductor 18 shown as the input coupling region. Hence in the input coupling region the energy of the electromagnetic wave is transformed to the fast cyclotron wave. As the fast cyclotron wave progresses towards the output end of the solid 18 it passes through the transition region. In this region the magnetic field is varied until the value of $B_2$ is achieved. The variation B from $B_1$ to $B_2$ is indicated as the transition region. It is in this region that the fast cyclotron wave undergoes a change in phase velocity enabling the fast cyclotron wave to eventually couple with the slow cyclotron wave that propagates in the cylindrical ring 25 due to the action of the magnetic field. Hence the fast cyclotron wave is gradually caused to undergo a change in velocity to allow it to couple with the slow cyclotron wave in the cylindrical ring 25. This coupling is completed in the interaction region. It is in this region that the fast cyclotron wave's energy is amplified or enhanced by the slow cyclotron wave in the cylindrical ring 25. When the interaction is complete the amplified wave progresses towards the output with a velocity equal to that of the slow cyclotron wave and with an increase in energy because of the coupling. The velocity of the slow cyclotron wave is speeded up once again by the use of the magnetic field profile in another transition region near the output. Hence the slow cyclotron wave is reconverted into a fast cyclotron wave which couples with output waveguide 23. This output wave in waveguide 23 is an electromagnetic wave with the same velocity as that at the input and at a greater energy level because of the coupling employed between the fast and slow cyclotron waves and the consequent energy transfer. It is to be noted, that the solid 18 should be insulated from the waveguides 22 and 23 when passing and extending through them.

It is obvious that as in the tube devices other modes can exist in the solids and can be utilized for coupling as by varying the plasma frequency which can be accomplished by different doping or concentration of carriers in various portions of the solid, together with a varying magnetic field profile. It is also obvious that the output electromagnetic wave could be coupled out at a lower phase velocity or a higher phase velocity than the input wave by raising or lowering the magnetic field intensity in the output coupling region.

What is claimed is:

1. A growing wave tube for operation at a given frequency comprising:

(a) means for producing an electron space charge in a given region;
(b) means for establishing a magnetic field in a given direction in said region;
(c) means for coupling a fast wave transmission line to the space charge in a first portion of said region to excite a fast cyclotron wave on said space charge parallel to said magnetic field;
(d) the intensity of said magnetic field in said portion being such that the phase velocity of said fast cyclotron wave therein is substantially equal to the phase velocity of waves along said coupling means at said given frequency; and
(e) means for projecting a stream of electrons through at least a second portion of said region in a direction substantially parallel to said given directions;
(f) the phase velocity of said fast cyclotron wave having a value in said second portion substantially equal to the phase velocity of a slow wave on said stream at said given frequency, for growing wave interaction with said slow wave.

2. A growing wave tube for operation at a given frequency comprising:

(a) means for producing an electron space charge in a given region;
(b) means for establishing a magnetic field in a given direction in said region;
(c) a fast wave transmission line comprising a hollow waveguide of rectangular cross-section;
(d) means, including an end portion of said waveguide extending substantially parallel to said magnetic field and defining a first portion of said region, for coupling said waveguide to said space charge to excite a fast cyclotron wave thereon parallel to said magnetic field;
(e) the intensity of said magnetic field in said portion being such that the phase velocity of said fast cyclotron wave therein is substantially equal to the phase velocity of waves along said coupling means at said given frequency; and
(f) means for projecting a stream of electrons through at least a second portion of said region in a direction substantially parallel to said given direction;
(g) the phase velocity of said fast cyclotron wave having a value in said second portion substantially equal to the phase velocity of a slow wave on said stream at said given frequency, for growing wave interaction with said slow wave.

3. A growing wave tube for operation at a given frequency comprising:

(a) means for producing an electron space charge in a given region;

(b) means for establishing a magnetic field in a given direction in said region;

(c) a fast wave transmission line comprising a coaxial line;

(d) means, including a cavity resonator coupled to said line and defining a first portion of said region, for coupling said coaxial line to said space charge to excite a fast cyclotron wave thereon parallel to said magnetic field;

(e) the intensity of said magnetic field in said portion being such that the phase velocity of said fast cyclotron wave therein is substantially equal to the phase velocity of waves along said coupling means at said given frequency; and (f) means for projecting a stream of electrons through at least a second portion of said region in a direction substantially parallel to said given direction;

(g) the phase velocity of said fast cyclotron wave having a value in said second portion substantially equal to the phase velocity of a slow wave on said stream at said given frequency, for growing wave interaction with said slow wave.

4. A growing wave tube for operation at a given frequency comprising:

(a) means for producing an electron space charge in a given region;

(b) means for establishing a magnetic field in a given direction in said region;

(c) a fast wave transmission line comprising a coaxial line;

(d) means, including a cavity resonator coupled to said line and defining a first portion of said region, for coupling said coaxial line to said space charge to excite a fast cyclotron wave thereon parallel to said magnetic field;

(e) the intensity of said magnetic field in said portion being such that the phase velocity of said fast cyclotron wave therein is substantially equal to the phase velocity of waves along said coupling means at said given frequency; and (f) means for projecting a stream of electrons through at least a second portion of said region in a direction substantially parallel to said given direction;

(g) the phase velocity of said fast cyclotron wave having a value in said second portion substantially equal to the phase velocity of a slow wave on said stream at said given frequency, for growing wave interaction with said slow wave;

(h) said cavity resonator comprising a pair of juxtaposed deflection plates mounted on opposite sides of the path of said first stream.

5. A growing wave tube for operation at a given frequency, comprising:

(a) means for projecting a first stream of electrons in a given direction through a given region in said tube;

(b) means for establishing a magnetic field in said region substantially parallel to said direction;

(c) means for coupling a fast wave transmission line to said stream in a first portion of said region to excite a fast cyclotron wave on said stream parallel to said magnetic field;

(d) the intensity of said magnetic field in said first portion being such that the phase velocity of said fast cyclotron wave is substantially equal to the phase velocity of waves along said coupling means at said given frequency; and (e) means for projecting a second stream of electrons through at least a second portion of said region in a direction substantially parallel to said given direction and with a drift velocity greater than that of said first stream;

(f) the phase velocity of said fast cyclotron wave having a value in said second portion substantially equal to the phase velocity of a slow wave on said second stream at said given frequency, for growing wave interaction with said slow wave.

6. A growing wave tube for operation at a given frequency, comprising:

(a) means for projecting a first stream of electrons in a given direction through a given region in said tube;

(b) means for establishing a magnetic field in said region substantially parallel to said direction;

(c) means for coupling a fast wave transmission line to said stream in a first portion of said region to excite a fast cyclotron wave on said stream parallel to said magnetic field;

(d) means for adjusting the intensity of said magnetic field in said first portion to a value at which the phase velocity of said fast cyclotron wave is substantially equal to the phase velocity of waves along said coupling means at said given frequency;

(e) means for projecting a second stream of electrons through at least a second portion of said region in substantially the same direction as said first stream and with a drift velocity greater than that of said first stream; and (f) means for changing the phase velocity of said fast cyclotron wave to a value in said second portion substantially equal to the phase velocity of a slow wave on said second stream at said given frequency, for growing wave interaction with said slow wave.

7. A growing wave tube as in claim 6, wherein said means for changing the phase velocity of said fast cyclotron wave comprises:

(a) means for adjusting the magnetic field intensity in said second portion to a lower value than said value in said first portion.

8. A growing wave tube as in claim 6, wherein said means for changing the phase velocity of said fast cyclotron wave comprises:

(a) means for adjusting the drift velocity of said first stream to a value in said second portion different from that in said first portion.

9. A growing wave tube for operation at a given frequency, comprising:

(a) means for projecting a first stream of electrons in a given direction through a given region in said tube;

(b) means for establishing a magnetic field in said region substantially parallel to said direction;

(c) means for coupling a fast wave transmission line to said stream in a first portion of said region to excite a fast cyclotron wave on said stream parallel to said magnetic field;

(d) means for adjusting the intensity of said magnetic field in said first portion to a value at which the phase velocity of said fast cyclotron wave is substantially equal to the phase velocity of waves along said coupling means at said given frequency;

(e) means for projecting a second stream of electrons through at least a second portion of said region in a direction substantially opposite from said first stream; and (f) means for changing the phase velocity of said fast cyclotron wave to a value in said second portion substantially equal to the phase velocity of a slow wave on said second stream at said given frequency, for growing wave interaction with said slow wave.

10. A growing wave tube for operation at a given frequency comprising:

(a) means for producing an electron space charge in a given region;

(b) means for establishing a magnetic field in a given direction in said region;

(c) means for coupling a fast wave transmission line to the space charge in a first portion of said region to excite a fast cyclotron wave on said space charge parallel to said magnetic field;

(d) the intensity of said magnetic field in said portion being such that the phase velocity of said fast cyclotron wave therein is substantially equal to the phase velocity of waves along said coupling means at said given frequency; and (e) means for projecting a stream of electrons through at least a second portion of said region in a direction substantially parallel to said given direction;

(f) the drift velocity of said space charge in said given direction being substantially zero;

(g) the phase velocity of said fast cyclotron wave having a value in said second portion substantially equal to the phase velocity of a slow wave on said stream at said given frequency, for growing wave interaction with said slow wave.

11. A growing wave tube for operation at a given frequency comprising:

(a) means for producing an electron space charge in a given region, (b) means for coupling a fast wave transmission line to the space charge in a first portion of said region to excite a fast wave at said frequency on said space charge in a given direction, (c) the phase velocity of said fast wave throughout said first portion being substantially equal to the phase velocity of the waves along said transmission line and coupling means at said given frequency, and (d) means for projecting a stream of electrons through at least a second portion of said region in a direction substantially parallel to said given direction, (e) the phase velocity of said fast wave on said space charge having a value in said second portion substantially equal to the phase velocity of a slow wave on said stream at said given frequency.

12. A growing wave tube for operation at a given frequency comprising:

(a) means for producing an electron space charge in a given region, (b) a fast wave transmission line comprising a hollow waveguide of rectangular cross-section, (c) means for changing the phase velocity of said fast defining a first portion of said region, for coupling said waveguide to said space charge to excite a fast wave at said frequency thereon in a given direction, (d) the phase velocity of said fast wave in said first portion being substantially equal to the phase velocity of the waves along said waveguide at said given frequency, and (e) means for projecting a stream of electrons through at least a second portion of said region in a direction substantially parallel to said given direction, (f) the phase velocity of said fast wave on said space charge having a value in said second portion substantially equal to the phase velocity of a slow wave on said stream at said given frequency.

13. A growing wave device for operation at a given frequency, comprising:

(a) means for producing groups of charge carriers in a given region, (b) means for coupling a fast wave transmission line to said carriers in a first portion of said region to excite a fast wave at said frequency on one of said carrier groups for propagation to a second portion of said region, (c) means for changing the phase velocity of said fast wave to a substantially lower value at the same frequency in said second portion whereby said changed phase velocity wave couples with a wave on another group of charged carriers in said second portion having a velocity substantially equal to that of said changed phase velocity wave.

14. A growing wave device for operation at a given frequency comprising:

(a) a first body of semiconductor material, (b) means for establishing a voltage across said first body whereby a first electron stream is caused to flow, (c) a second body of semiconductor material longitudinal and in close proximity with said first body, (d) means for establishing a voltage across said second body whereby a second electron stream is caused to flow in the same direction as said first stream, (e) means for producing a magnetic field longitudinal to said first and second bodies, (f) input means coupled to said first body wherein a fast wave can propagate, (g) means for coupling said fast wave to said first electron stream, whereby a fast wave propagates on said first electron stream, (h) means for slowing down said fast wave on said first electron stream whereby said fast wave on said stream is caused to couple to a slow wave on said second stream in said second body.

15. A growing wave device for operation at a given frequency, comprising:

(a) means for producing a group of charged particles in a given region, (b) means for coupling a fast wave transmission line to said particles in a first portion of said region to excite a fast wave at said frequency on said particles for propagation to a second portion of said region, (c) means for projecting a stream of charged particles through at least said second portion of said region in a direction parallel to the direction of propagation of said fast wave, and (d) means for changing the phase velocity of said fast wave during said propagation to a substantially lower value at the same frequency in said second portion, for exciting a slow wave at said frequency on said stream of charged particles.

16. A growing wave device for operation at a given frequency comprising:

(a) means for producing charge carriers in a given region, (b) means for coupling a fast wave transmission line to said charge carriers in a first portion of said region to excite a fast wave at said frequency in a given direction on said charge carriers, (c) the phase velocity of said first wave throughout said portion being substantially equal to the phase velocity of the waves along said transmission line, (d) means for projecting a charge carrier stream through at least a second portion of said region in a direction substantially parallel to said given direction, (e) the phase velocity of said fast wave having a value in said second portion substantially equal to the phase velocity of a slow wave on said stream at said given frequency.

17. Means for coupling a fast wave transmission line to a stream of charge carriers at a given frequency, comprising:

(a) means for producing charge carriers in a given region;

(b) means for coupling a fast wave transmission line to said charge carriers in a first portion of said region to excite a fast wave at said frequency on said charge carriers for a propagation to a second portion of said region, (c) means for projecting a stream of charge carriers through said region in a direction parallel to the direction of propagation of said fast wave, and (d) means for changing the phase velocity of said fast wave during said propagation to a lower value at the same frequency in said second portion for exciting a slow wave at said frequency on said stream.

18. Coupling means according to claim 17 and wherein said means for slowing down said fast wave comprises:

(a) means for adjusting the magnetic field from a low value in said first portion to a higher value in said second portion.

19. A growing wave device for operation at a given frequency comprising:

(a) a body of semiconductor material capable of supporting a drifting carrier stream, (b) refrigerating means enclosing said body,
(c) means for impressing a potential across said body to cause said stream to propagate,
(d) means for establishing a magnetic field in a given direction longitudinal to said body,
(e) means for coupling a fast electromagnetic wave to said carrier stream whereby said electromagnetic wave's energy is transferred to a fast cyclotron wave in a first portion of said body,
(f) means for adjusting said magnetic field in a second portion of said body causing said fast cyclotron wave's velocity to be slowed to a lower velocity in accordance with said magnetic field such that said slowed wave can couple to a slow cyclotron wave in said second portion transferring said first cyclotron wave's energy to said slow cyclotron wave,
(g) means for adjusting said magnetic field in a third portion of said body whereby said slow cyclotron wave's velocity is increased enabling it to be transformed to a second fast cyclotron wave in said third portion, and
(h) output coupling means associated with said third portion whereby said second fast cyclotron wave in said third portion propagates as a fast wave in said output coupling means.

20. A growing wave device for operation at a given frequency comprising:
(a) a body of solid material capable of supporting drifting carrier streams,
(b) refrigerating means enclosing said solid,
(c) means for impressing a potential across said body to cause said streams to propagate,
(d) means for establishing a magnetic field longitudinal to said body,
(e) means for coupling a fast wave to one of said carrier streams in said body to excite a fast cyclotron wave in a first region of said body, and
(f) means for slowing down said fast cyclotron wave to allow it to couple to a slow cyclotron wave in a second region of said body, whereby said fast cyclotron wave transfers its energy to said slow cyclotron wave.

No references cited.

HERMAN KARL SAALBACH, *Primary Examiner.*

S. CHATMON, Jr., *Assistant Examiner.*